March 30, 1965 C. HORBERG, JR 3,176,088
SEQUENTIAL SWITCHING CONTROL UNIT
Filed Dec. 6, 1961 3 Sheets-Sheet 1
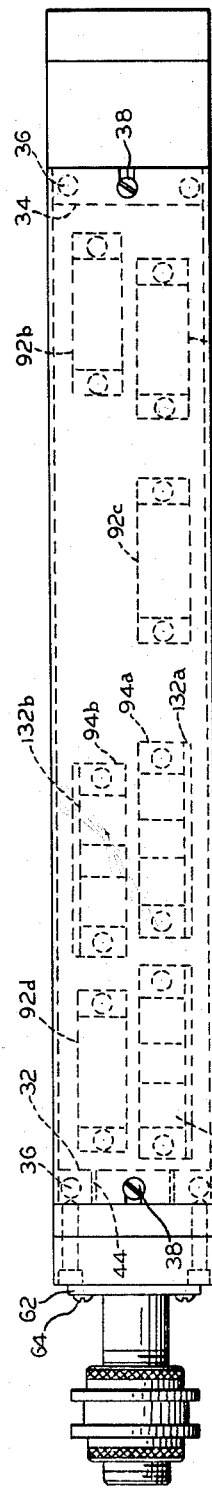
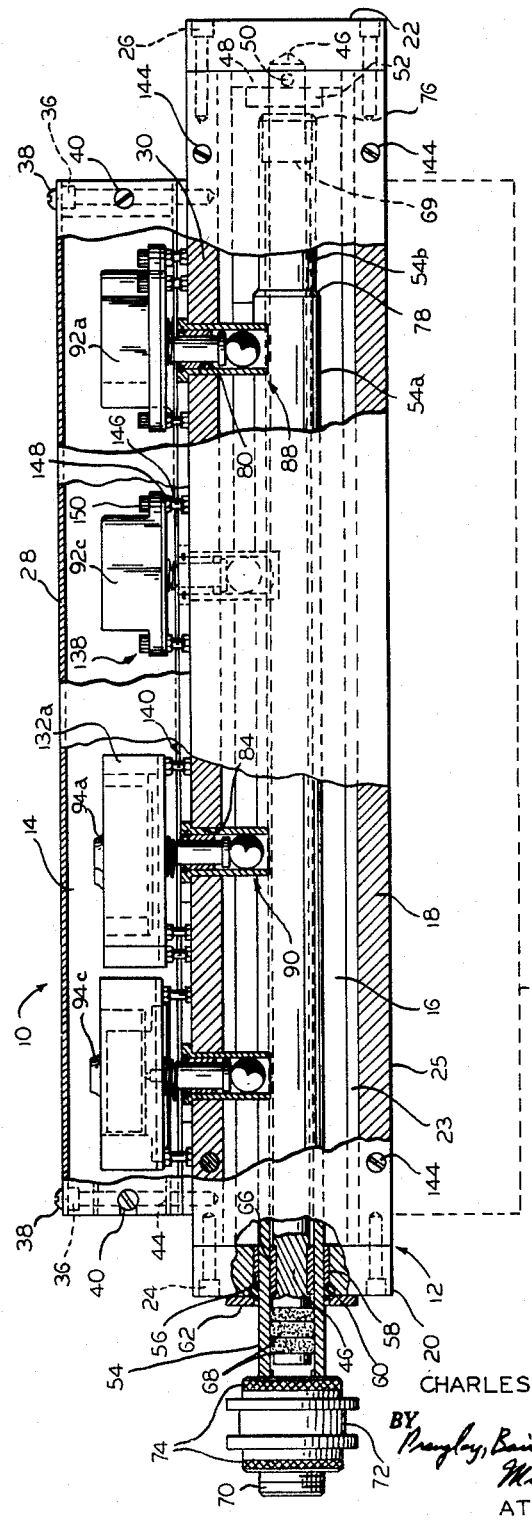
INVENTOR.
CHARLES HORBERG JR.
BY
ATTORNEYS March 30, 1965 C. HORBERG, JR 3,176,088
SEQUENTIAL SWITCHING CONTROL UNIT
Filed Dec. 6, 1961 3 Sheets-Sheet 2

*INVENTOR.*
CHARLES HORBERG JR.
BY
*Crawley, Baird, Clayton, McRae & Vogel*
ATTORNEYS March 30, 1965 C. HORBERG, JR 3,176,088
SEQUENTIAL SWITCHING CONTROL UNIT
Filed Dec. 6, 1961 3 Sheets-Sheet 3

INVENTOR.
CHARLES HORBERG JR.
BY
ATTORNEYS

United States Patent Office 3,176,088
Patented Mar. 30, 1965

3,176,088
SEQUENTIAL SWITCHING CONTROL UNIT
Charles Horberg, Jr., Chicago, Ill., assignor to Paramount Textile Machinery Co., Kankakee, Ill., a corporation of Illinois
Filed Dec. 6, 1961, Ser. No. 157,522
2 Claims. (Cl. 200—5)

This invention relates to a linear switching control unit adapted for the electrical control of mechanisms in response to movement or travel of parts thereof or of other mechanisms, and particularly, to a new and improved unit having a plurality of control switches.

In my U.S. Patent No. 2,968,710, I have disclosed a new linear control unit which is very useful for controlling machines constructed of electrically controlled mechanisms. The control unit is employed with a single reciprocating machine member to control the member or other machine mechanisms. An important object of the present invention is to provide means for selectively actuating a plurality of control switches mounted in the unit.

Another object is to provide a linear control unit having new and improved switch actuating means.

A particular object is to provide a unit including a movable actuator which carries cam means for selectively actuating control switches.

Another particular object is to provide improved means for interengaging the cam means and the switches.

A further particular object is to provide a unit which is adjustable for closely regulating the operation of the switches.

An additional object is to provide a linear control unit wherein the electrical components are isolated from mechanical components, thus providing a safe, reliable unit and a unit which may be maintained and repaired by mechanics or electricians as may be required, without need for both.

Another object is to provide a compact, versatile and adaptable linear control unit.

These and other objects, advantages and functions of the invention will be apparent on reference to the specification and to the attached drawings illustrating a preferred embodiment of the invention, in which like parts are identified by like reference symbols in each of the views, and and in which:

FIGURE 1 is a top plan view of the linear control unit;

FIG. 2 is a side elevational view thereof with parts broken away and also with parts shown in longitudinal section;

Figure 3:
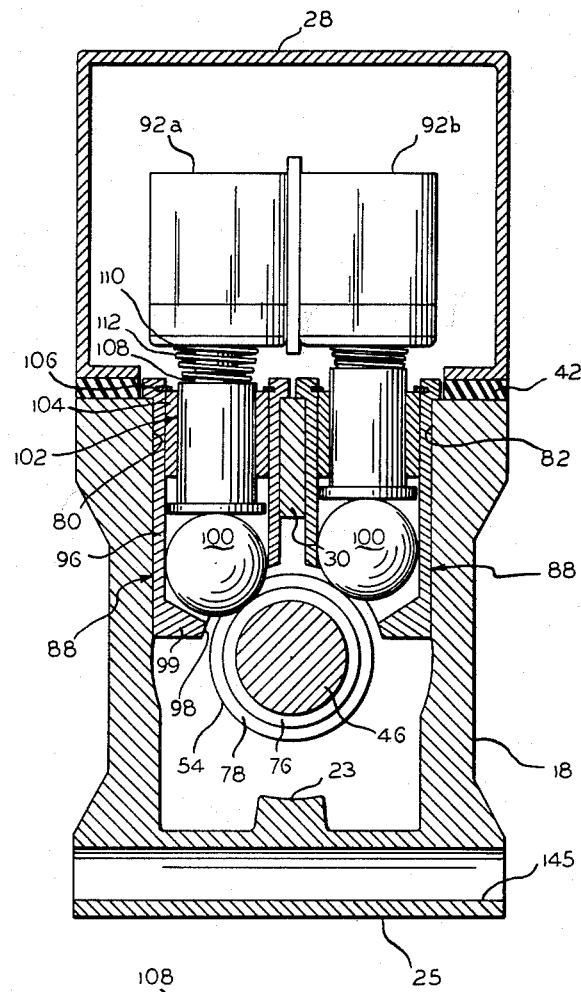
FIG. 3 is an enlarged cross-sectional view thereof illustrating one form of a switch actuating plunger assembly employed in the unit.

The linear control unit of the invention includes a hollow casing, control switch means within the casing, an actuator linearly movable in the casing, a plurality of cam surfaces at different elevations on the actuator, and means including cam follower means in the casing for actuating the switch means in response to movement of the actuator, the cam follower means being engageable with respective cam surfaces for selectively actuating the switch means.

Referring to FIGS. 1 and 2 of the drawings, the linear control unit is generally indicated by the number 10. It includes a hollow elongated generally rectangular casing or housing 12 having a mechanical or actuator compartment 16 and an electrical or switch compartment 14 adjacent thereto. The actuator compartment is constructed as a one-piece elongated rectangular hollow body 18 which may be, for example, an aluminum extrusion. The opposite ends of the body are open, and respective end plates 20 and 22 are secured thereover by means of respective screws 24 and 26. The plates are located on the ends of the body by a longitudinal indexing rib 23 integral with the body on the inner surface of an outer side wall 25.

A hollow elongated rectangular switch case or cover 28 is secured on one side wall 30 of the body 18, opposite to the outer wall 25. Supports or end plates 32 and 34 (FIG. 1) are mounted at the respective ends of the case 28 and are secured on the side wall 30 of the body by means of screws 36. The case 28 is secured on the end supports 32 and 34 by means of top screws 38 and side screws 40. As illustrated more clearly in FIGS. 3 and 5, a gasket 42, which may be constructed of neoprene, is interposed between the case 28 and the body 18. One end support 32 is provided with a longitudinal circular electrical outlet opening 44 for connecting an electrical conduit to the unit. Additional outlet openings may be provided in other locations for increased convenience, in which case the unused openings are plugged.

The control unit casing 10 is thus constructed of the body 18 which provides an actuator compartment and the case 28 which provides a switch compartment therewith. The compartments are separated by a dividing or partition wall 30 integral with the body 18. The wall extends across the casing to completely separate the compartments, in particular, to prevent any foreign materials, parts or implements from entering either compartment from the other. Employing the new construction, the parts are isolated for safety and reliability in use and in working on the units, and mechanics and electricians may work separately on the respective assemblies with which they are concerned.

A cylindrical guide rod 46 is centrally longitudinally mounted in the body 18 and in the end plates 20 and 22. The guide rod is secured in an inner annular boss 48 on one end plate 22 by means of a pin 50. An annular actuator stop 52, preferably constructed of rubber, is mounted around the guide rod 46 adjacent the boss 48.

A tubular cylindrical actuator 54 is mounted coaxially on the guide rod 46, for longitudinal reciprocal sliding movement thereon. The actuator extends from the interior of the body 18, within the actuator compartment 16, to the exterior. The actuator and guide rod extend through an opening 56 in one end plate 20. A bearing 58 is mounted in the opening around the actuator. A wiper ring 60, which may be constructed of Teflon, is mounted around the actuator adjacent the outer edge of bearing. The wiper ring is held in position by a retainer 62 secured to the end plate 20 by screws 64. The cross section of the guide rod 46 is reduced in diameter adjacent the end mounted in the opening 56, and a bearing 66 is mounted in the recessed portion. A further reduced section is provided on the guide rod outwardly of the bearing, and oil rings 68, which may be of felt or the like, are secured thereon. A bearing 69 is mounted on the the inner wall of the actuator 54 at its inner end.

The outer end 70 of the actuator 54 is threaded. A circular flanged connector 72 is mounted thereon and adjustably secured in position by means of lock nuts 74 on opposite sides thereof in threaded engagement with the actuator end 70. The connector 72 is adapted for receiving a yoke or the like to connect the actuator 54 to a moving machine member for reciprocating movement therewith.

The actuator 54 is composed to a major extent of a cylindrical portion 54a, and to a minor extent of a cylindrical portion 54b having a reduced diameter relative thereto and constituting the inner terminal portion of the actuator. The reduced terminal portion terminates in a frusto-conical cam surface 76 comprising the end of the actuator. A second frusto-conical cam surface 78 extends from the surface of the reduced actuator portion 54b to the surface of the larger portion 54a at the junction of the portions. The respective cam surfaces are thus at different elevations or radial distances on the actuator 54. The cam surfaces may function at all points on their respective surfaces around the actuator.

Figure 4:
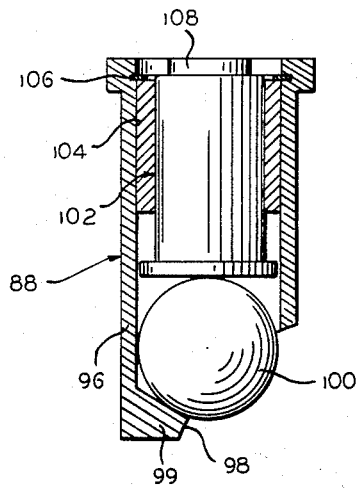
FIG. 4 is a further enlarged view of the plunger assembly, corresponding to FIG. 3.
Figure 5:
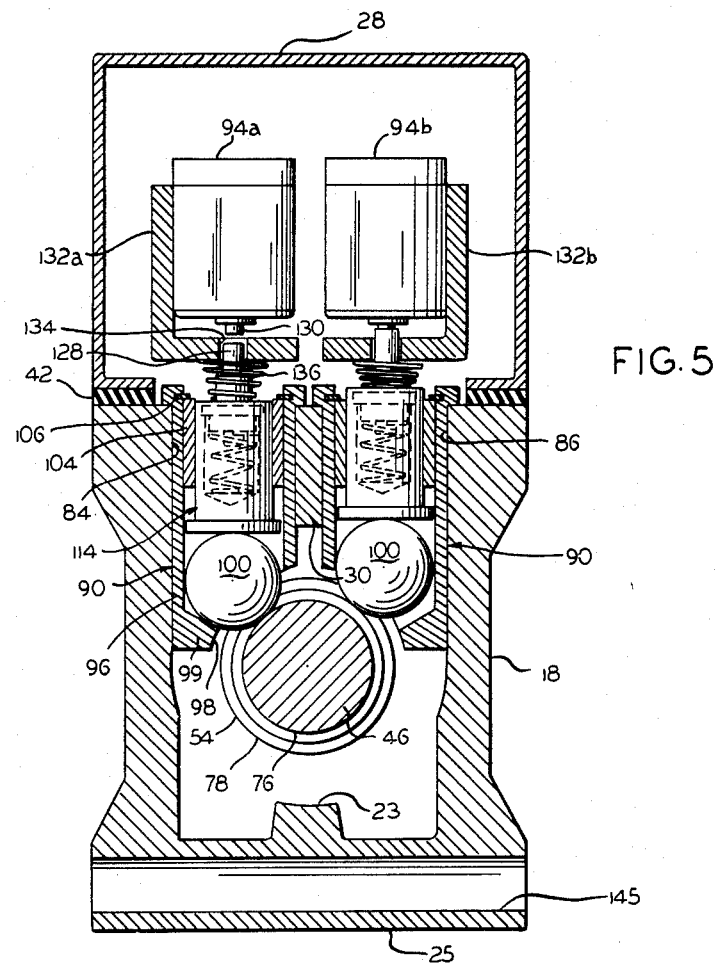
FIG. 5 is a view like FIG. 3 illustrating a second plunger assembly employed in the unit.
Figure 6:
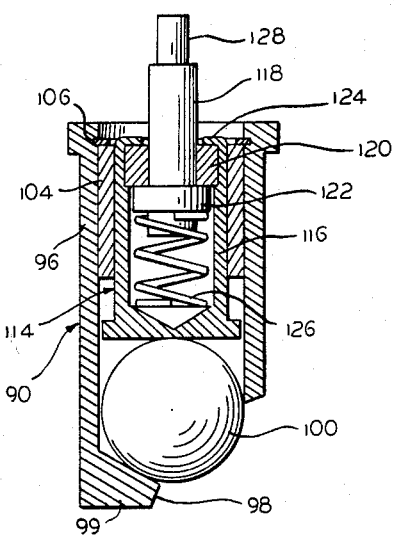
FIG. 6 is a view like FIG. 4 of the second plunger assembly.

As illustrated in FIGS. 2, 3 and 5, the separating wall 30 is provided with a plurality of passages or openings therethrough such as indicated at 80, 82, 84 and 86. Either of two types of switch actuating plunger assemblies is interchangeably mounted therein, the assemblies sealing or closing the passages between the switch and actuator compartments 14 and 16. One type of plunger assembly 88 is illustrated in FIGS. 3 and 4, and the other plunger assembly 90 is illustrated in FIGS. 5 and 6. The plunger assemblies 88 and 90 interengage the cam surfaces 76 and 78 on the actuator 54, and suitable control switches illustrated as being of two types and indicated respectively at 92a, b, c and d, and 94a, b and c, in the switch compartment 14.

Referring to FIGS. 3 and 4, each plunger assembly 88 includes a tubular plunger guide cylinder 96 mounted in a wall opening such as 80 and extending towards the actuator 54 on one side of its axis. The cylinder terminates short of the actuator, in a circularly recessed open inner portion 98 defining an arc of greater diameter than the actuator and having the same center of curvature. The cylinder 96 includes an inwardly extending ledge 99 at its inner end adjacent the recessed portion. A cam follower ball 100 is held captive in the guide cylinder 96, and it normally extends through the recessed open portion 98 in contact with the guide rod 46 or with the actuator 54. The cam follower ball is adapted to engage the cam surfaces 76 and 78, respectively, which move the ball longitudinally or upwardly in the guide cylinder 96. In the illustrative embodiment, a plurality of plunger assemblies are disposed across the separating wall 30, and the cam surfaces 76 and 78 engage the cam follower balls at points angularly disposed about the actuator 54. While the plunger assemblies as illustrated are laterally offset from the axis of the actuator, such assemblies also may be mounted centrally, above the axis.

The plunger assemblies 88 include one-piece plungers 102 which are engageable with the cam follower balls 100 and are axially reciprocally movable in the cylinders 96. A bearing 104 is interposed between the plunger and the cylinder, and it is secured by a snap ring 106 mounted in a corresponding groove in the cylinder inner wall. The plunger includes an outer head 108 of reduced diameter which engages an actuating button or pin 110 of a switch such as 92a and 92b. A coiled plunger return spring 112 is mounted around the switch button and the plunger head for normally urging the plunger away from the switch.

In the foregoing assembly, the cam follower balls 100 rest in lower positions thereof either on the surface of the actuator guide rod 46 or on the elvated surface of the reduced actuator portion 54b without moving the plunger 102 sufficiently to actuate the switch 92a or 92b. Upon contact with the cam surface 78 of greater radial distance joining the reduced actuator portion 54b to the larger portion 54a, a ball 100 is moved onto the surface of the larger actuator portion 54a and causes the plunger 102 to depress the switch button 110 and actuate the switch, as in the case of switch 92b in FIG. 3. The parts remain in the same positions as long as the ball 100 remains on the surface of the larger actuator portion. When the actuator 54 is moved from right to left in FIG. 2, the plunger 102 is moved away from the switch by the return spring 112, and the ball 100 returns to contact the surface of the reduced portion 54b, thus restoring the switch. This condition is illustrated for the switch 92a in FIG. 3. Further movement to the left causes the ball 100 to rest on the rod 46, with the plunger assembly in the condition shown in FIG. 4.

The plunger assemblies 90 illustrated in FIGS. 5 and 6 are engageable with the cam surface 76 at the lesser radial distance to actuate the switches 94a and 94b. Over-travel means are provided in the plunger assembly, providing for further engagement with the cam surface 78 at the greater radial distance, and subsequent engagement with the larger actuator portion 54a. In the plunger assembly 90, the following parts may be the same as in the plunger assembly 88: the cylinder 96 and the recessed open edge 98 and ledge 99 thereof; the cam follower ball 100; the bearing 104; and the split ring 106.

In the plunger assembly 90, a switch actuating plunger 114 is engageable with the cam follower ball 100 and axially reciprocably movable in the cylinder 96. The plunger includes a tubular pin holder 116 closed at one end engaging the ball 100. A plunger pin 118 is mounted in the holder for movement therewith and also for axial movement relative thereto. The pin is secured in the holder by a retaining ring 120 engaging an annular enlargement 122 thereon, and by an annular flange 124 integral with the open end of the holder and extending inwardly over the washer 120. A spring 126 is mounted in the holder between its closed end and the pin 118, bearing on the enlargement 122 thereon, for urging the holder and pin apart. The plunger pin 118 terminates in an upper or outer reduced diameter head 128 which engages a switch button or pin 130 on the switch 94a or 94b.

The switches 94a, b and c are mounted on L-shaped brackets such as indicated at 132a and b in FIG. 5, and the brackets have base openings 134 therein registering with the switch buttons 130. The plunger pin head 128 is movable in the bracket opeing 134 to engage the switch button and actuate the switch. A plunger return spring 136 is mounted around the plunger pin 118 between the bracket and the pin holder 116 to urge the switch and plunger 114 apart.

When the cam follower ball 100 of the foregoing plunger assembly 90 rests upon the actuator guide rod 46, the switch 94a, b or c associated therewith is inoperative. This condition is illustrated for the switch 94a in FIG. 5, and the plunger assembly parts are as shown in FIG. 6. Upon contact with the inner cam surface 76, the ball is moved radially outwardly onto the surface of the reduced actuator portion 54b, to cause the plunger pin head 128 to depress the switch button 130 and actuate the switch. This condition is illustrated for the switch 94b in FIG. 5. Subsequent engagement of the ball 100 with the outer cam surface 78 causes the ball to move onto the surface of the larger actuator portion 54a. At this time, the spring 126 in the pin holder 116 is compressed and the holder moves outwardly relative to the pin 118, thus accommodating the over-travel of the cam follower ball 100. The engagement of the plunger pin 118 with the switch thus remains the same while the ball 100 is in contact with either of the actuator larger and smaller portions 54a and 54b.

When the ball 100 returns to the surface of the smaller portion 54b, upon right to left movement of the actuator 54 as illustrated in FIG. 2, the internal spring 126 expands, and the relative positions of the pin holder 116 and the pin 118 are restored to those illustrated in FIG. 6. At this time, the ball 100 is in the postion illustrated for the right-hand assembly 90 in FIG. 5. Further right to left movement of the actuator 54, as illustrated in FIG. 2, causes the return of the plunger 114 and the ball 100 to the positions illustrated for the left hand plunger assembly 90 of FIG. 5 and also in FIG. 6, through the action of the plunger return spring 136. Thereupon, the switch 94a, b or c is restored.

As illustrated in FIGS. 1 and 2, numerous arrangements of the switches 92 and 94 may be employed. A number of plunger assembly mounting openings such as 80 and 84 may be provided in the separating wall 30, and appropriate openings are selected for mounting switches thereover, with unused openings being closed. The switches 92 are mounted in the switch compartment 14 by any suitable means, preferably by adjustable threaded nut and bolt connections such as generally indicated at 138 in FIG. 2, joining apertured flanges on the switches to the separating wall 30. Each connection includes a threaded bolt 146 secured to the wall 30, an adjusting nut 148 threaded thereon beneath the switch flange, and a locking nut 150 threaded thereon above the flange. Similarly, the switches 94 are supported by brackets such as 132a, and the brackets are connected to the separating wall 30 by adjustable threaded nut and bolt connecting or mounting means generally indicated at 140. The respective switches 92 and 94 are mounted in spaced relation to the separating wall 30, and the several spacings may be adjusted as desired by the mounting means 138 and 140. For fine control, the mounting openings such as 80 and 84 preferably are custom bored in the wall 30 at the desired locations for actuating the switches. The adjustable mounting means 138 and 140 for the switches enable fine adjustment of the switches towards or away from the plunger assemblies 88 and 90, to regulate the operation of the switches very closely.

The plunger assemblies 88 and 90 may be mounted in any of the wall openings such as 80 or 84 for cooperation with the switches mounted thereover. The switches may be mounted in parallel or staggered side-by-side relation, along opposite sides of the separating wall 30. One or more of the switches may be mounted centrally of the wall, and various other arrangements are possible. The construction also is adapted for mounting one or more switches on any other side wall of the actuator compartment body 18. For example, an additional or alternative position of the switch compartment case 28 on the opposite side wall 25 is indicated in broken lines at 142 in FIG. 2. The switches may be mounted therein over appropriate openings or passages provided in the adjoining wall 25, in like manner to the embodiment illustrated in full lines.

In use, the linear control unit 10 is mounted on a flat surface by means of screws 144 (FIG. 2), inserted through corresponding transverse openings 145 (FIGS. 3 and 5) in the walls of the body 18, with the unit parallel in two planes to the movement of a reciprocally movable machine member or slide to be controlled. The connector 72 on the actuator 54 is linked to the machine member for axial reciprocal movement therewith by a yoke or other suitable means, not shown. When the machine being controlled is in operation, the reciprocally moving machine member and the actuator 54 reciprocate together. As the actuator moves from its extreme left hand position to the right, in the illustration of FIG. 2, the leading cam surface 76 of lesser radial distance contacts each of the cam follower balls 100 at their respective locations, camming the balls onto the reduced actuator portion 54b. Thereupon, the switch 94c is actuated, while the switch 92d remains inoperative. As the movement of the actuator 54 continues, the cam follower balls are contacted by the second cam surface 78 having a greater radius, and the balls are cammed onto the larger actuator portion 54a. Thereupon, the switch 92d is actuated, while the switch 94c remains actuated. The pin 118 and the pin holder 116 of the plunger of the latter switch are moved closer together against the tension of the intervening spring 126 to provide for the resulting over-travel of the cam follower ball 100 when moved onto the larger actuator portion. Similarly, the remaining switches in the switch compartment 14 are actuated as the actuator 54 moves to the right. In the illustrative embodiment, the switch 92b may serve as a reversing limit switch to reverse the direction of movement of the machine member and of the actuator 54. The cylindrical design of the actuator provides for a certain over-travel thereof before the movement is reversed, up to the point that the actuator would contact the stop 52.

As the actuator 54 moves from right to left, the switches 92a–d are restored when the cam follower balls 100 thereof move from the larger actuator portion 54a to the reduced portion 54b. The switches 94a–c are restored when the cam follower balls 100 thereof move from the reduced actuator portion 54b to the surface of the actuator guide rod 46. In the illustrative embodiment, the switch 94c may serve as a reversing limit switch, to again reverse the direction of movement of the machine member and of the actuator. This completes a cycle of operation, and the cycle is repeated as long as the machine is in operation.

The new linear control unit is adapted for mounting a number of control switches therein to regulate various mechanisms by the movement of a machine member. Various combinations are possible, and the switches are operated selectively at desired locations in the travel of the actuator. The unit is compact and readily mounted in a convenient location. It is serviceable and requires little maintenance. Switches may be added and removed conveniently. The switch compartment 14 is separately accessible by removing the case 28, and the actuator compartment 16 is accessible by removing the end plates 20 and 22. Each compartment is isolated from the other and either may be worked on independently of the other.

It will be apparent that various changes and modifications may be made in the construction and arrangement of the parts within the spirit and scope of the invention. It is intended that such changes and modifications be included within the scope of the appended claims.

I claim:

1. A linear switching control unit which comprises, in combination, a hollow casing, a cylindrical actuator, means mounting said actuator on said casing for back and forth longitudinal axial movement in the casing, a plurality of circumferential cam surfaces on said actuator disposed in spaced apart relation therealong and extending transversely outwardly for different distances from the longitudinal axis of the actuator, a plurality of control switches in said casing, a plurality of plungers in said casing associated with said switches respectively for actuating the switches upon movement of the plungers, a cam follower means associated with each of said plungers and disposed adjacent said actuator for engagement by a cam surface, and means mounting each of said plungers and its associated cam follower means for back and forth movement transversely of said actuator axis for actuating the switch associated therewith, at least one of said cam follower means being engaged and moved by an inner one of said cam surfaces to move its associated plunger and thereby actuate the switch associated therewith, and at least one other of said cam follower means being engaged and moved by an outer one of said cam surfaces to move its associated plunger and thereby actuate the switch associated therewith only upon such engagement, when said actuator is moved in said casing.

2. A control unit as defined in claim 1 wherein said one cam follower means is also engaged and moved by said outer cam surface in moving said actuator in said casing, and the plunger associated with said one cam follower means comprises a plunger pin engageable with the associated switch for actuating the switch, a pin holder associated with said first cam follower means, means movably mounting said pin on said holder permitting them to be moved together to contract the plunger in the direction of its movement, and spring means interposed between said pin and said holder biasing them apart in said direction, whereby when said first cam follower means is engaged and moved by said outer cam surface, its associated plunger is resiliently contracted to accommodate the extension of said outer cam surface beyond said inner cam surface.

References Cited by the Examiner
UNITED STATES PATENTS

| | | | |
|---|---|---|---|
| 1,926,419 | 9/33 | Apple | 200—153 X |
| 2,838,622 | 6/58 | Bachi | 200—153 X |

BERNARD A. GILHEANY, *Primary Examiner.*